United States Patent
Zhang et al.

(10) Patent No.: US 10,476,737 B2
(45) Date of Patent: Nov. 12, 2019

(54) HYBRID FIBER COAXIAL (HFC) NETWORK FAULT LOCATING METHOD, APPARATUS, AND SYSTEM

(71) Applicant: Huawei Technologies Co., Ltd., Shenzhen, Guangdong (CN)

(72) Inventors: Xiaolong Zhang, Wuhan (CN); Chenghu Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/971,981

(22) Filed: May 4, 2018

(65) Prior Publication Data
US 2018/0254946 A1 Sep. 6, 2018

Related U.S. Application Data

(63) Continuation of application No. PCT/CN2015/094060, filed on Nov. 6, 2015.

(51) Int. Cl.
*H04L 12/24* (2006.01)
*H04L 12/28* (2006.01)
(Continued)

(52) U.S. Cl.
CPC .......... *H04L 41/0677* (2013.01); *H04L 12/28* (2013.01); *H04L 12/2801* (2013.01); *H04L 12/44* (2013.01); *H04L 43/00* (2013.01)

(58) Field of Classification Search
CPC combination set(s) only.
See application file for complete search history.

(56) References Cited

U.S. PATENT DOCUMENTS

2002/0080439 A1* 6/2002 Stoneback ......... A61K 41/0061
                                                                398/33
2007/0019557 A1   1/2007 Catter et al.
(Continued)

FOREIGN PATENT DOCUMENTS

CN         1484904 A      3/2004
CN       101079668 A     11/2007
(Continued)

OTHER PUBLICATIONS

"Data Over Cable Service Interface Specifications DOCSIS® 3.0, Physical Layer Specification"; CM-SP-PHYv3.0-I11-130808; Cable Television Laboratories, Inc.; 2006-2013, 200 pages.
(Continued)

*Primary Examiner* — Mewale A Ambaye
(74) *Attorney, Agent, or Firm* — Leydig, Voit & Mayer, Ltd.

(57) ABSTRACT

Embodiments of the present disclosure disclose a hybrid fiber coaxial (HFC) network fault locating method and apparatus. The method includes: obtaining a fault group in an HFC network; collecting a pre-equalization coefficient of at least one cable modem (CM); enabling a reference fault point that is corresponding to the fault group and whose location is known; collecting the pre-equalization coefficient of the at least one CM again; and determining a relative distance between each fault point in the fault group and the reference fault point according to the pre-equalization coefficient collected twice. In the present disclosure, not only each fault point in a fault group including a plurality of fault points can be located, but also a fault group including only a single fault point can be located.

12 Claims, 7 Drawing Sheets

(51) Int. Cl.
*H04L 12/26* (2006.01)
*H04L 12/44* (2006.01)

(56) References Cited

U.S. PATENT DOCUMENTS

| | | |
|---|---|---|
| 2007/0133425 A1 | 6/2007 | Chappell |
| 2011/0194418 A1 | 8/2011 | Wolcott et al. |
| 2014/0267788 A1 | 9/2014 | Bowler et al. |
| 2017/0180935 A1* | 6/2017 | Kang .................... H04W 4/023 |
| 2017/0201293 A1* | 7/2017 | Zhang ...................... H04B 3/48 |
| 2017/0310539 A1* | 10/2017 | Jin ........................... H04B 3/46 |

FOREIGN PATENT DOCUMENTS

| | | |
|---|---|---|
| CN | 102967803 A | 3/2013 |
| CN | 103969554 A | 8/2014 |
| CN | 105007182 A | 10/2015 |

OTHER PUBLICATIONS

"DOCSIS® Best Practices and Guidelines; Proactive Network Maintenance Using Pre-equalization"; CM-GL-PNMP-V02-110623; Cable Television Laboratories, Inc.; 2010-2011; 133 pages.
CN/201580081709.1, Office Action, dated Jul. 1, 2019.

\* cited by examiner

US 10,476,737 B2

HYBRID FIBER COAXIAL (HFC) NETWORK FAULT LOCATING METHOD, APPARATUS, AND SYSTEM

CROSS-REFERENCE TO RELATED APPLICATIONS

This application is a continuation of International Application No. PCT/CN2015/094060, filed on Nov. 6, 2015, the disclosure of which is hereby incorporated by reference in its entirety.

TECHNICAL FIELD

The present application relates to the field of communications technologies, and in particular, to an HFC network fault locating method, apparatus, and system.

BACKGROUND

A hybrid fiber coaxial (HFC) network technology is an economical and practical integrated digital service broadband network access technology. An HFC network structure generally includes a network management system, a coaxial cable modem termination system (CMTS), an optical station, a cable modem (CM), a user side device, a fiber, a coaxial cable, an amplifier, an attenuator, and the like. However, a problem may occur in each device, each component, and each cable that are included in an HFC network. Therefore, an uplink signal of the HFC network is affected by various line distortions, such as a group delay and micro-reflection. To compensate for the line distortions in the HFC, the third-generation data over cable service interface specification (DOCSIS 3.0) defines a pre-equalizer. There is a pre-equalizer inside each CM, so that a signal can be reversely compensated before the CM transmits the signal. A fault group (that is, formed by at least one fault point) in the network may be found in advance by analyzing a pre-equalization coefficient of the CM, and an approximate location of the fault group is determined. However, in the foregoing fault locating method, only a relative distance between every two fault points included in the fault group can be calculated by using the pre-equalization coefficient of the CM, and each fault point cannot be located. In addition, a fault group including only a single fault point cannot be located.

SUMMARY

Embodiments of the present disclosure disclose an HFC network fault locating method, apparatus, and system, so that a fault group including only a single fault point can be located, and each fault point in a fault group including a plurality of fault points can be located.

A first aspect of the embodiments of the present disclosure discloses an HFC network fault locating method, including:

obtaining a fault group in a hybrid fiber coaxial HFC network, where the fault group includes at least one fault point;

collecting a pre-equalization coefficient of at least one cable modem CM, to obtain a first pre-equalization coefficient set, where the at least one CM is a CM whose pre-equalization coefficient changes after the fault group emerges;

enabling a reference fault point that is corresponding to the fault group and whose location is known, where the reference fault point is an impedance mismatch point that changes the pre-equalization coefficient of the at least one CM;

collecting the pre-equalization coefficient of the at least one CM again, to obtain a second pre-equalization coefficient set;

calculating a relative distance between every two fault points in the fault group according to the first pre-equalization coefficient set, to obtain a first relative distance set; and calculating a relative distance between every two fault points in a fault point set according to the second pre-equalization coefficient set, to obtain a second relative distance set, where the fault point set includes the fault group and the reference fault point, and the second relative distance set includes the first relative distance set; and determining a relative distance between each fault point and the reference fault point according to the first relative distance set and the second relative distance set.

With reference to the first aspect of the embodiments of the present disclosure, in a first possible implementation of the first aspect of the embodiments of the present disclosure, the method further includes:

obtaining an estimated bearing of the fault group, where the estimated bearing includes an approximate direction and location at which the fault group is located; and determining a location of each fault point according to the relative distance between each fault point and the reference fault point, the estimated bearing of the fault group, and the location of the reference fault point.

With reference to the first aspect or the first possible implementation of the first aspect of the embodiments of the present disclosure, in a second possible implementation of the first aspect of the embodiments of the present disclosure, the calculating a relative distance between every two fault points in the fault group according to the first pre-equalization coefficient set, to obtain a first relative distance set; and calculating a relative distance between every two fault points in a fault point set according to the second pre-equalization coefficient set, to obtain a second relative distance set includes:

performing analysis processing on the first pre-equalization coefficient set by using a proactive network maintenance using pre-equalization PNMP algorithm, to obtain the relative distance between every two fault points in the fault group, and using the relative distance as the first relative distance set; and performing analysis processing on the second pre-equalization coefficient set by using the PNMP algorithm, to obtain the relative distance between every two fault points in the fault point set, and using the relative distance as the second relative distance set.

With reference to the first aspect, or the first or the second possible implementation of the first aspect of the embodiments of the present disclosure, in a third possible implementation of the first aspect of the embodiments of the present disclosure, a reflection loss of the reference fault point is known, and the method further includes:

calculating a fault severity between every two fault points according to the first pre-equalization coefficient set, to obtain a first fault severity set; and calculating a fault severity between every two fault points in the fault point set according to the second pre-equalization coefficient set, to obtain a second fault severity set, where the second fault severity set includes the first fault severity set;

determining a fault severity between each fault point and the reference fault point according to the first fault severity set and the second fault severity set; and determining a reflection loss of each fault point according to the fault severity between each fault point and the reference fault point and the reflection loss of the reference fault point, so that different levels of maintenance can be performed for reflection losses of different fault points.

With reference to the third possible implementation of the first aspect of the embodiments of the present disclosure, in a fourth possible implementation of the first aspect of the embodiments of the present disclosure, the calculating a fault severity between every two fault points according to the first pre-equalization coefficient set, to obtain a first fault severity set; and calculating a fault severity between every two fault points in the fault point set according to the second pre-equalization coefficient set, to obtain a second fault severity set includes:

performing analysis processing on the first pre-equalization coefficient set by using the PNMP algorithm, to obtain the fault severity between every two fault points, and using the fault severity as the first fault severity set; and performing analysis processing on the second pre-equalization coefficient set by using the PNMP algorithm, to obtain the fault severity between every two fault points in the fault point set, and using the fault severity as the second fault severity set.

With reference to the third or the fourth possible implementation of the first aspect of the embodiments of the present disclosure, in a fifth possible implementation of the first aspect of the embodiments of the present disclosure, the determining a reflection loss of each fault point according to the fault severity between each fault point and the reference fault point and the reflection loss of the reference fault point includes:

calculating, for each of the fault points, the reflection loss of the fault point according to the fault severity between the fault point and the reference fault point and the reflection loss of the reference fault point, where the reflection loss of the fault point is an absolute difference obtained by subtracting the reflection loss of the reference fault point from the fault severity between the fault point and the reference fault point.

A second aspect of the embodiments of the present disclosure discloses an HFC network fault locating apparatus, including:

an obtaining unit, configured to obtain a fault group in a hybrid fiber coaxial HFC network, where the fault group includes at least one fault point;

a first collection unit, configured to collect a pre-equalization coefficient of at least one cable modem CM, to obtain a first pre-equalization coefficient set, where the at least one CM is a CM whose pre-equalization coefficient changes after the fault group emerges;

an enabling unit, configured to enable a reference fault point that is corresponding to the fault group and whose location is known, where the reference fault point is an impedance mismatch point that changes the pre-equalization coefficient of the at least one CM;

a second collection unit, configured to: after the enabling unit enables the reference fault point that is corresponding to the fault group and whose location is known, collect the pre-equalization coefficient of the at least one CM, to obtain a second pre-equalization coefficient set;

a calculation unit, configured to: calculate a relative distance between every two fault points in the fault group according to the first pre-equalization coefficient set obtained by the first collection unit, to obtain a first relative distance set; and calculate a relative distance between every two fault points in a fault point set according to the second pre-equalization coefficient set obtained by the second collection unit, to obtain a second relative distance set, where the fault point set includes the fault group and the reference fault point, and the second relative distance set includes the first relative distance set; and a determining unit, configured to determine a relative distance between each fault point and the reference fault point according to the first relative distance set and the second relative distance set that are obtained by the calculation unit.

With reference to the second aspect of the embodiments of the present disclosure, in a first possible implementation of the second aspect of the embodiments of the present disclosure, the obtaining unit is further configured to obtain an estimated bearing of the fault group, where the estimated bearing includes an approximate direction and location at which the fault group is located; and the determining unit is further configured to determine a location of each fault point according to the relative distance between each fault point and the reference fault point, the estimated bearing of the fault group, and the location of the reference fault point.

With reference to the second aspect or the first possible implementation of the second aspect of the embodiments of the present disclosure, in a second possible implementation of the second aspect of the embodiments of the present disclosure, a manner in which the calculation unit calculates the relative distance between every two fault points in the fault group according to the first pre-equalization coefficient set obtained by the first collection unit, to obtain the first relative distance set; and calculates the relative distance between every two fault points in the fault point set according to the second pre-equalization coefficient set obtained by the second collection unit, to obtain the second relative distance set is specifically:

the calculation unit performs, by using a proactive network maintenance using pre-equalization PNMP algorithm, analysis processing on the first pre-equalization coefficient set obtained by the first collection unit, to obtain the relative distance between every two fault points in the fault group, and uses the relative distance as the first relative distance set; and performs, by using the PNMP algorithm, analysis processing on the second pre-equalization coefficient set obtained by the second collection unit, to obtain the relative distance between every two fault points in the fault point set, and uses the relative distance as the second relative distance set.

With reference to the second aspect, or the first or the second possible implementation of the second aspect of the embodiments of the present disclosure, in a third possible implementation of the second aspect of the embodiments of the present disclosure, a reflection loss of the reference fault point is known;

the calculation unit is further configured to: calculate a fault severity between every two fault points according to the first pre-equalization coefficient set obtained by the first collection unit, to obtain a first fault severity set; and calculate a fault severity between every two fault points in the fault point set according to the second pre-equalization coefficient set obtained by the second collection unit, to obtain a second fault severity set, where the second fault severity set includes the first fault severity set;

the determining unit is further configured to determine a fault severity between each fault point and the reference fault point according to the first fault severity set and the second fault severity set that are obtained by the calculation unit; and the determining unit is further configured to determine a reflection loss of each fault point according to the fault severity between each fault point and the reference fault point and the reflection loss of the reference fault point, so that different levels of maintenance can be performed for reflection losses of different fault points.

With reference to the third possible implementation of the second aspect of the embodiments of the present disclosure, in a fourth possible implementation of the second aspect of the embodiments of the present disclosure, a manner in which the calculation unit calculates the fault severity between every two fault points according to the first pre-equalization coefficient set obtained by the first collection unit, to obtain the first fault severity set; and calculates the fault severity between every two fault points in the fault point set according to the second pre-equalization coefficient set obtained by the second collection unit, to obtain the second fault severity set is specifically:

the calculation unit performs, by using the PNMP algorithm, analysis processing on the first pre-equalization coefficient set obtained by the first collection unit, to obtain the fault severity between every two fault points, and uses the fault severity as the first fault severity set; and performs, by using the PNMP algorithm, analysis processing on the second pre-equalization coefficient set obtained by the second collection unit, to obtain the fault severity between every two fault points in the fault point set, and uses the fault severity as the second fault severity set.

With reference to the third or the fourth possible implementation of the second aspect of the embodiments of the present disclosure, in a fifth possible implementation of the second aspect of the embodiments of the present disclosure, a manner in which the determining unit determines the reflection loss of each fault point according to the fault severity between each fault point and the reference fault point and the reflection loss of the reference fault point is specifically:

the determining unit calculates, for each of the fault points, the reflection loss of the fault point according to the fault severity between the fault point and the reference fault point and the reflection loss of the reference fault point, where the reflection loss of the fault point is an absolute difference obtained by subtracting the reflection loss of the reference fault point from the fault severity between the fault point and the reference fault point.

A third aspect of the embodiments of the present disclosure discloses an HFC network fault locating apparatus, including a processor, a memory, an input apparatus, and a communications bus, where the memory is configured to store a program and data;

the communications bus is configured to establish connection and communication between the processor, the memory, and the input apparatus; and the processor is configured to invoke the program stored in the memory to perform the following steps:

obtaining a fault group in a hybrid fiber coaxial HFC network, where the fault group includes at least one fault point;

controlling the input apparatus to collect a pre-equalization coefficient of at least one cable modem CM, to obtain a first pre-equalization coefficient set, where the at least one CM is a CM whose pre-equalization coefficient changes after the fault group emerges;

enabling a reference fault point that is corresponding to the fault group and whose location is known, where the reference fault point is an impedance mismatch point that changes the pre-equalization coefficient of the at least one CM;

controlling the input apparatus to collect the pre-equalization coefficient of the at least one CM again, to obtain a second pre-equalization coefficient set;

calculating a relative distance between every two fault points in the fault group according to the first pre-equalization coefficient set, to obtain a first relative distance set; and calculating a relative distance between every two fault points in a fault point set according to the second pre-equalization coefficient set, to obtain a second relative distance set, where the fault point set includes the fault group and the reference fault point, and the second relative distance set includes the first relative distance set; and determining a relative distance between each fault point and the reference fault point according to the first relative distance set and the second relative distance set.

With reference to the third aspect of the embodiments of the present disclosure, in a first possible implementation of the third aspect of the embodiments of the present disclosure, the processor is further configured to invoke the program stored in the memory to perform the following steps:

obtaining an estimated bearing of the fault group, where the estimated bearing includes an approximate direction and location at which the fault group is located; and determining a location of each fault point according to the relative distance between each fault point and the reference fault point, the estimated bearing of the fault group, and the location of the reference fault point.

With reference to the third aspect or the first possible implementation of the third aspect of the embodiments of the present disclosure, in a second possible implementation of the third aspect of the embodiments of the present disclosure, a manner in which the processor calculates the relative distance between every two fault points in the fault group according to the first pre-equalization coefficient set, to obtain the first relative distance set; and calculates the relative distance between every two fault points in the fault point set according to the second pre-equalization coefficient set, to obtain the second relative distance set is specifically:

performing analysis processing on the first pre-equalization coefficient set by using a proactive network maintenance using pre-equalization PNMP algorithm, to obtain the relative distance between every two fault points in the fault group, and using the relative distance as the first relative distance set; and performing analysis processing on the second pre-equalization coefficient set by using the PNMP algorithm, to obtain the relative distance between every two fault points in the fault point set, and using the relative distance as the second relative distance set.

With reference to the third aspect, or the first or the second possible implementation of the third aspect of the embodiments of the present disclosure, in a third possible implementation of the third aspect of the embodiments of the present disclosure, a reflection loss of the reference fault point is known, and the processor is further configured to invoke the program stored in the memory to perform the following steps:

calculating a fault severity between every two fault points according to the first pre-equalization coefficient set, to obtain a first fault severity set; and calculating a fault severity between every two fault points in the fault point set according to the second pre-equalization coefficient set, to obtain a second fault severity set, where the second fault severity set includes the first fault severity set;

determining a fault severity between each fault point and the reference fault point according to the first fault severity set and the second fault severity set; and determining a reflection loss of each fault point according to the fault severity between each fault point and the reference fault point and the reflection loss of the reference fault point, so that different levels of maintenance can be performed for reflection losses of different fault points.

With reference to the third possible implementation of the third aspect of the embodiments of the present disclosure, in a fourth possible implementation of the third aspect of the embodiments of the present disclosure, a manner in which the processor calculates the fault severity between every two fault points according to the first pre-equalization coefficient set, to obtain the first fault severity set; and calculates the fault severity between every two fault points in the fault point set according to the second pre-equalization coefficient set, to obtain the second fault severity set is specifically:

performing analysis processing on the first pre-equalization coefficient set by using the PNMP algorithm, to obtain the fault severity between every two fault points, and using the fault severity as the first fault severity set; and performing analysis processing on the second pre-equalization coefficient set by using the PNMP algorithm, to obtain the fault severity between every two fault points in the fault point set, and using the fault severity as the second fault severity set.

With reference to the third or the fourth possible implementation of the third aspect of the embodiments of the present disclosure, in a fifth possible implementation of the third aspect of the embodiments of the present disclosure, a manner in which the processor determines the reflection loss of each fault point according to the fault severity between each fault point and the reference fault point and the reflection loss of the reference fault point is specifically:

calculating, for each of the fault points, the reflection loss of the fault point according to the fault severity between the fault point and the reference fault point and the reflection loss of the reference fault point, where the reflection loss of the fault point is an absolute difference obtained by subtracting the reflection loss of the reference fault point from the fault severity between the fault point and the reference fault point.

A fourth aspect of the embodiments of the present disclosure discloses an HFC network fault locating system, including at least one CM and the HFC network fault locating apparatus disclosed in the second aspect of the embodiments of the present disclosure.

In the embodiments of the present disclosure, the fault group in the hybrid fiber coaxial HFC network may be obtained, the pre-equalization coefficient of the at least one cable modem CM is collected, to obtain the first pre-equalization coefficient set, and the reference fault point that is corresponding to the fault group and whose location is known is enabled. Then, the pre-equalization coefficient of the at least one CM may be collected again, to obtain the second pre-equalization coefficient set. The relative distance between every two fault points in the fault group is calculated according to the first pre-equalization coefficient set, to obtain the first relative distance set; the relative distance between every two fault points in the fault point set including all fault points and the reference fault point is calculated according to the second pre-equalization coefficient set, to obtain the second relative distance set. The relative distance between each fault point and the reference fault point is determined according to the first relative distance set and the second relative distance set. It may be learned that, during implementation of the embodiments of the present disclosure, the reference fault point whose location is known can be added to the fault group, and before and after the reference fault point is added, the pre-equalization coefficient of the CM is collected twice to calculate the relative distance between each fault point in the fault group and the reference fault point, so as to obtain the location of each fault point in the fault group, so that not only each fault point in a fault group including a plurality of fault points can be located, but also a fault group including only a single fault point can be located.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure disclose an HFC network fault locating method, apparatus, and system. A reference fault point whose location is known can be added to a fault group, and before and after the reference fault point is added, a pre-equalization coefficient of a CM is collected twice to calculate a relative distance between each fault point in the fault group and the reference fault point, so as to obtain a location of each fault point in the fault group, so that not only each fault point in a fault group including a plurality of fault points can be located, but also a fault group including only a single fault point can be located. Details are separately described below.

Figure 1:
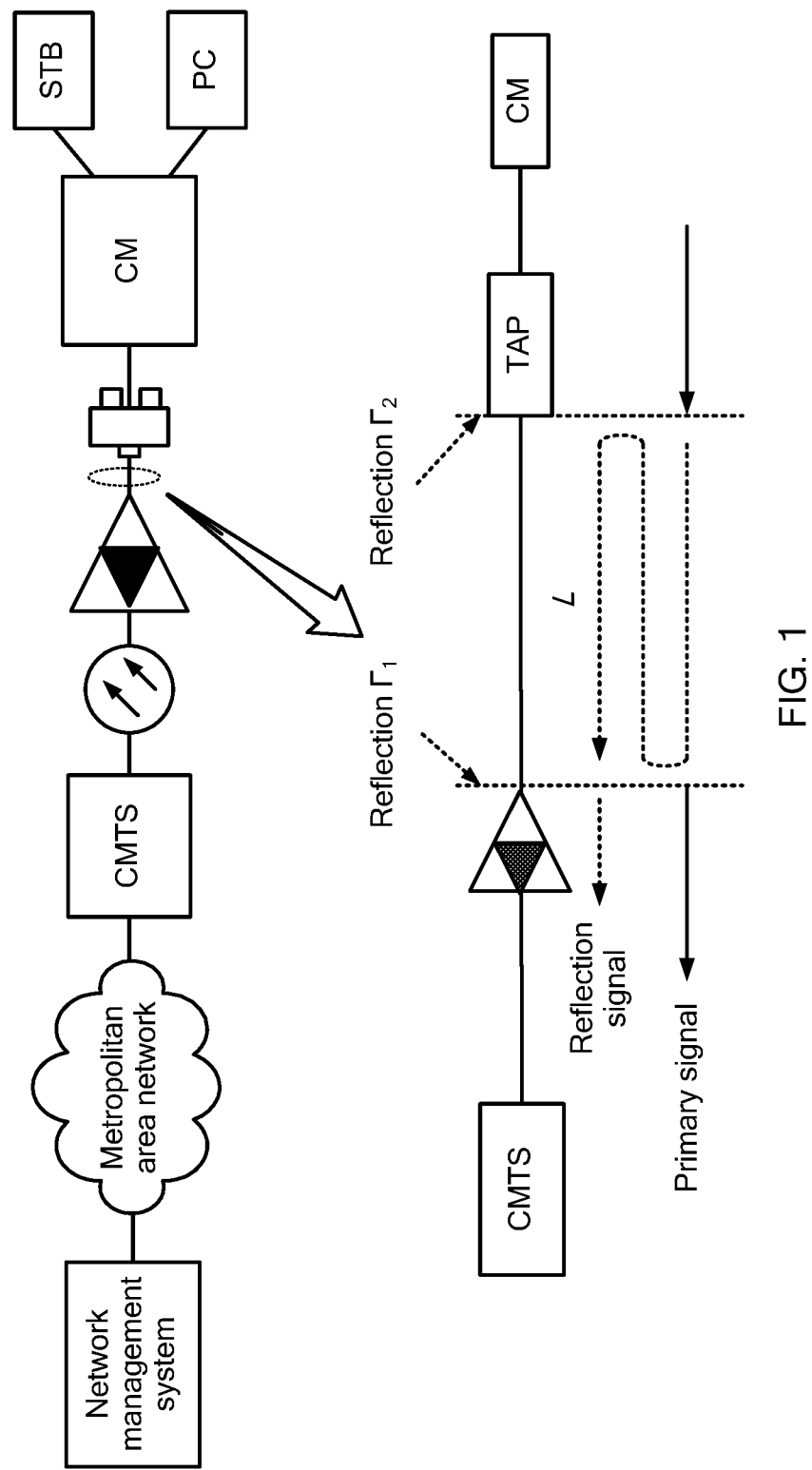
FIG. 1 is a schematic diagram of an HFC network architecture disclosed in an embodiment of the present disclosure.

For a better understanding of the embodiments of the present disclosure, an HFC network architecture disclosed in the embodiments of the present disclosure is first described below. Referring to FIG. 1, FIG. 1 is a schematic diagram of an HFC network architecture disclosed in an embodiment of the present disclosure. The HFC network architecture shown in FIG. 1 may include a network management system, a coaxial cable modem termination system (CMTS), an optical station, an amplifier, an attenuator, a tap, a splitter, a cable modem (CM), and a user side device, for example, a device or a component such as an STB (set top box) or a PC (personal computer) (components are not shown one by one in the figure). The network management system may be communicatively connected to the CMTS by using a metropolitan area network (MAN). Other devices and components in the HFC network may be communicatively connected by using a fiber or a coaxial cable. In the HFC network architecture shown in FIG. 1, the network management system is a control center of the whole HFC network, may be configured to monitor and manage running of the whole HFC network, and may include but is not limited to a device such as a computer or a network management server. The CMTS is configured to manage and control the CM device. The HFC network may include one or more CM devices, and each CM device may further be connected to one or more user equipments (such as the STB or the PC).

In the HFC network architecture shown in FIG. 1, a fault may occur in each device, each component, and each cable that exist in the HFC network. Therefore, an uplink signal of the HFC network is affected by various line distortions. As shown in FIG. 1, when there is a fault on a line between the amplifier and the TAP, micro-reflection (also referred to as an echo) is formed between two fault points. The micro-reflection is caused by an impedance mismatch point (that is, a fault point) in the network, that is, a mismatch between input impedance and output impedance causes reflection. At a location at which a mismatch occurs, a portion of energy of an incident wave is reflected back, a reflected signal and a primary signal are overlaid at a receive end of the CMTS, and therefore a standing wave is formed, thereby causing a line distortion. To compensate for the line distortion in the HFC network, a pre-equalizer may be disposed inside each CM. The pre-equalizer is a linear filter having 24 tap coefficients, and the 24 coefficients form a pre-equalization coefficient of the CM. A fault in the HFC network and an approximate location may be found in advance by analyzing the pre-equalization coefficient of the CM. In addition, an impedance mismatch point whose location is known may be disposed in each component and device in the HFC network, and may be enabled or disabled. When the impedance mismatch point is enabled, a reference fault point whose location is known is constructed, so that a specific location of another fault point may be obtained on the basis of the reference fault point. During implementation of the HFC network architecture shown in FIG. 1, the reference fault point whose location is known can be added to the fault group, and before and after the reference fault point is added, the pre-equalization coefficient of the CM is collected twice to calculate the relative distance between each fault point in the fault group and the reference fault point, so as to obtain the location of each fault point in the fault group, so that not only each fault point in a fault group including a plurality of fault points can be located, but also a fault group including only a single fault point can be located.

Figure 2:
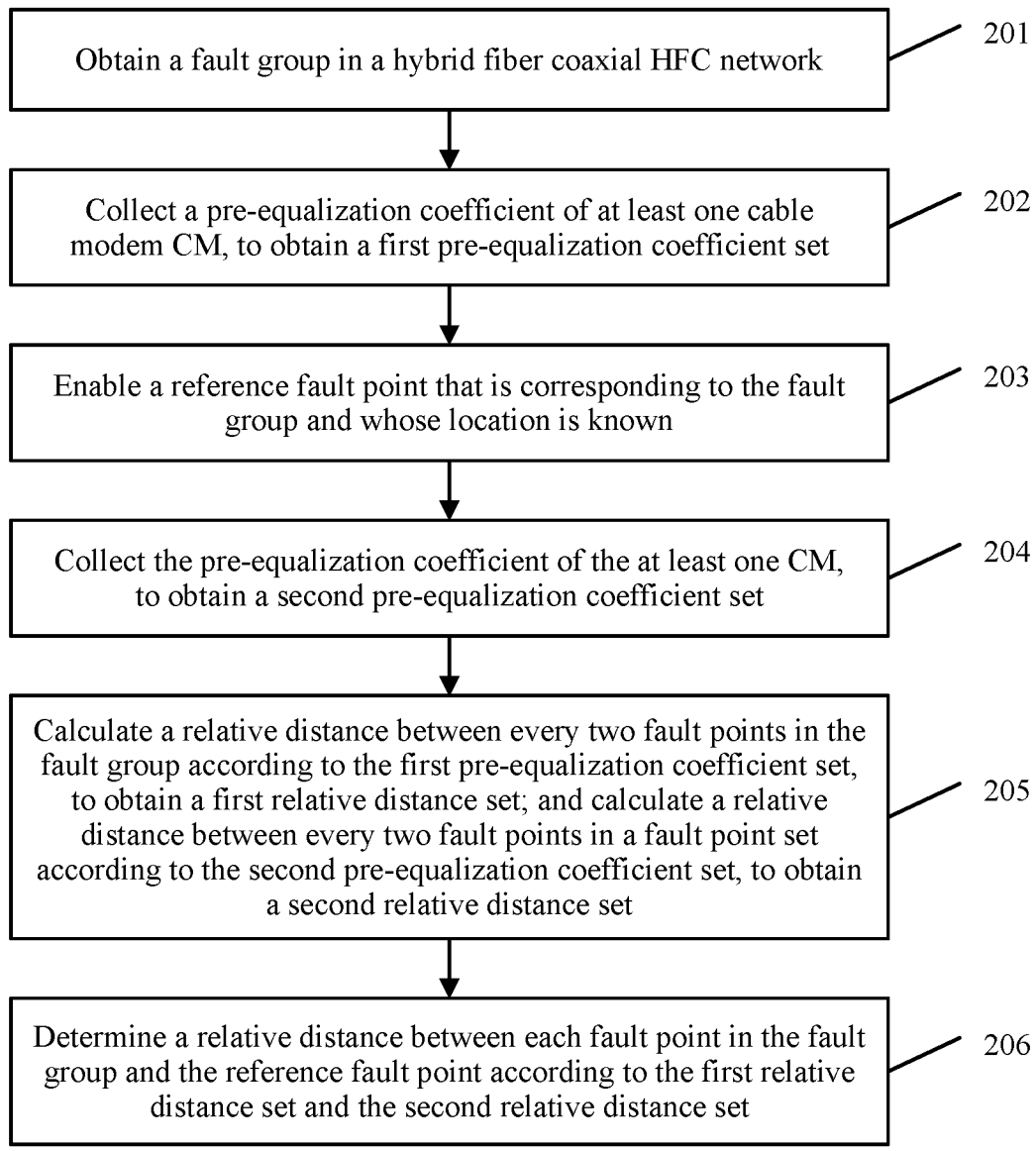
FIG. 2 is a schematic flowchart of an HFC network fault locating method disclosed in an embodiment of the present disclosure.

On the basis of the HFC network architecture shown in FIG. 1, an embodiment of the present disclosure discloses an HFC network fault locating method. Referring to FIG. 2, FIG. 2 is a schematic flowchart of an HFC network fault locating method disclosed in an embodiment of the present disclosure. In this embodiment of the present disclosure, that an execution body is a network management system may be used as an example for description. When the execution body is another apparatus or device, implementation of this embodiment of the present disclosure is not affected. As shown in FIG. 2, the HFC network fault locating method may include the following steps.

201. The network management system obtains a fault group in a hybrid fiber coaxial HFC network.

In this embodiment of the present disclosure, a fault caused by one or more fault points may be referred to as a fault group. One fault group may include at least one fault point. The HFC network may have one fault group, or may have a plurality of fault groups at the same time.

In this embodiment of the present disclosure, the network management system may obtain a historical fault group in the HFC network, and use the historical fault group as a fault group in this operation. Alternatively, when having no idea of a fault, the network management system may collect a pre-equalization coefficient of a CM in the entire HFC network, and find a fault group in the HFC network by analyzing the pre-equalization coefficient. Alternatively, the network management system may obtain a fault group by analyzing a performance parameter of the CM on each line. The performance parameter may include a parameter such as an MER (modulation error ratio), a level value, and a quantity of packet losses. For example, if there is a phenomenon in which MERs of all CMs on a line become smaller, or an uplink MER or a level jumps frequently, or an error code or a packet loss occurs, it indicates that there is a fault group on the line. The foregoing methods may be used separately, or may be used in combination. This is not limited in this embodiment of the present disclosure.

Figure 3:
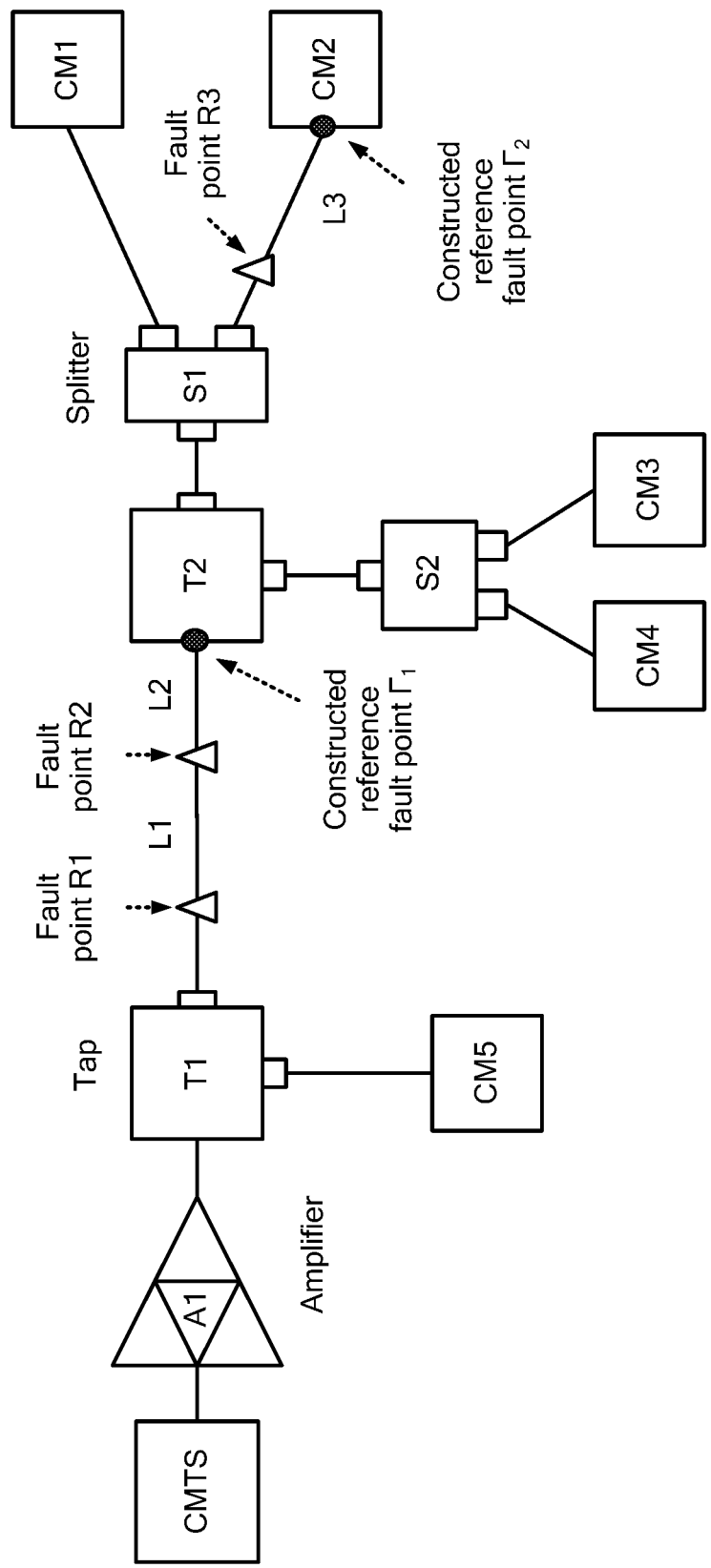
FIG. 3 is a partial schematic diagram of an HFC network fault disclosed in an embodiment of the present disclosure.

Referring to FIG. 3, FIG. 3 is a partial schematic diagram of an HFC network fault disclosed in an embodiment of the present disclosure. FIG. 3 shows only some components, devices, and lines in the HFC network. A structure thereof does not constitute a limitation on the embodiments of the present disclosure. The structure may include components more or fewer than those shown in the figure, or may combine some components, or may have different component arrangements. Pre-equalization coefficients of all CMs shown in FIG. 3 may be collected, and the pre-equalization coefficients of all the CMs are analyzed. When pre-equalization coefficients of a CM1 to a CM4 have a relatively great change (a reason for the change is that the pre-equalization coefficients need to compensate for a line distortion caused by a fault), while a pre-equalization coefficient of a CM5 has no obvious change, it may indicate that the CM1 to the CM4 are affected by a fault group (that is, the CM1 to the CM4 experience a signal distortion during uplink transmission because of impact of a fault group 1), and the CM5 is not affected by the fault group, and therefore, it may be initially determined that the fault group 1 exists roughly between taps T1 and T2. Further, whether there is a fault group formed by a single fault point in the HFC network may be inquired, and a performance parameter of each CM may be obtained. When an MER of the CM2 becomes smaller, or a packet loss is severe, while performance parameters of other CMs are relatively stable, it indicates that the CM2 is affected by a fault group, and the other CMs are not affected by the fault group, and therefore, it may be initially determined that another fault group 2 exists roughly between a splitter S1 and the CM2.

202. The network management system collects a pre-equalization coefficient of at least one CM, to obtain a first pre-equalization coefficient set.

In this embodiment of the present disclosure, when it is obtained that there are a plurality of fault groups in the HFC network, to avoid confusion, for each fault group, the network management system may collect a pre-equalization coefficient of at least one CM related to the fault group, and combine the pre-equalization coefficient of the at least one CM into a first pre-equalization coefficient set. The at least one CM may be a CM whose pre-equalization coefficient changes after the fault group emerges, that is, at least one CM affected by the fault group. For example, before the fault group emerges, the pre-equalization coefficient of the at least one CM is relatively stable; and after the fault group emerges, the pre-equalization coefficient of the at least one CM fluctuates relatively greatly.

Partial HFC network faults shown in FIG. 3 are used as an example for description. It may be learned through analysis that the CM1 to the CM4 are affected by the fault group 1, and the CM2 is affected by the fault group 2. To avoid confusion, for the fault group 1, pre-equalization coefficients of the CM 3 and the CM 4 may be collected to obtain a first pre-equalization coefficient set {CM3, CM4} for the fault group 1; for the fault group 2, a pre-equalization coefficient of the CM2 may be collected to obtain a first pre-equalization coefficient set {CM2} for the fault group 2.

203. The network management system enables a reference fault point that is corresponding to the fault group and whose location is known.

In this embodiment of the present disclosure, the reference fault point may be an impedance mismatch point at which the pre-equalization coefficient of the at least one CM that is collected for the fault group changes. The impedance mismatch point may be a point at which input impedance does not match output impedance. An impedance mismatch causes signal reflection, and therefore a fault occurs. An impedance mismatch point may be disposed in each component and device in the HFC network, and the impedance mismatch point may be remotely enabled or disabled automatically, or may be enabled or disabled manually. Because a location of each impedance mismatch point is known, when an impedance mismatch point is enabled, the impedance mismatch point constructs a reference fault point whose location is known.

In this embodiment of the present disclosure, the impedance mismatch point may be selectively enabled. To avoid an excessively complicated system, generally, only one impedance mismatch point whose location is known is enabled for a fault group, and the impedance mismatch point may be enabled for one device selected from devices at two ends of a line on which the fault group is located. When a location range of the fault group is excessively large, and it is not easy to determine to enable which impedance mismatch point, an enumeration method may be used to try to enable impedance mismatch points within a fault area range one by one.

Partial HFC network faults shown in FIG. 3 are used as an example for description. For the fault group 1, an impedance mismatch point at T1 or T2 may be selected and enabled to construct a reference fault point $\Gamma_1$. In FIG. 3, the impedance mismatch point at T2 is enabled. Preferably, a selected and enabled impedance mismatch point and a fault group are on a same line. To avoid impact of a device, an impedance mismatch point is generally not enabled across a device. For example, an impedance mismatch point at a splitter S2 is generally not enabled. For the fault group 2, an impedance mismatch point at S1 or the CM2 may be selected and enabled to construct a reference fault point $\Gamma_2$. In FIG. 3, the impedance mismatch point at the CM2 is enabled.

204. The network management system collects the pre-equalization coefficient of the at least one CM again, to obtain a second pre-equalization coefficient set.

In this embodiment of the present disclosure, when the network management system enables the reference fault point that is corresponding to the fault group and whose location is known, the pre-equalization coefficient of the at least one CM that is collected for the fault group changes. Therefore, the pre-equalization coefficient of the at least one CM may be collected again, to obtain the second pre-equalization coefficient set.

Partial HFC network faults shown in FIG. 3 are used as an example for description. For the fault group 1, after the impedance mismatch point at T2 is enabled to construct the reference fault point $\Gamma_1$, the pre-equalization coefficients of the CM3 and the CM4 may be collected again, to obtain a second pre-equalization coefficient set {CM3', CM4'} for the fault group 1. For the fault group 2, after the impedance mismatch point at the CM2 is enabled to construct the reference fault point $\Gamma_2$ the pre-equalization coefficient of the CM2 may be collected again, to obtain a second pre-equalization coefficient set {CM2'} for the fault group 2.

205. The network management system calculates a relative distance between every two fault points in the fault group according to the first pre-equalization coefficient set, to obtain a first relative distance set; and calculates a relative distance between every two fault points in a fault point set according to the second pre-equalization coefficient set, to obtain a second relative distance set.

In this embodiment of the present disclosure, for each fault group, the network management system may calculate, according to an obtained first pre-equalization coefficient set of the fault group, a relative distance between every two fault points included in the fault group, and use a calculation result as a first relative distance set; and calculate a relative distance between every two fault points in a fault point set according to an obtained second pre-equalization coefficient set of the fault group, and use a calculation result as a second relative distance set. The fault point set includes all fault points included in the fault group and a reference fault point added for the fault group. The second relative distance set includes the first relative distance set.

In an optional implementation, a specific implementation of step 205 in which a relative distance between every two fault points in the fault group is calculated according to the first pre-equalization coefficient set, to obtain a first relative distance set; and a relative distance between every two fault points in a fault point set is calculated according to the second pre-equalization coefficient set, to obtain a second relative distance set may include the following step:

(21) The network management system performs analysis processing on the first pre-equalization coefficient set by using a proactive network maintenance using pre-equalization (PNMP) algorithm, to obtain the relative distance between every two fault points in the fault group, and uses the relative distance as the first relative distance set; and performs analysis processing on the second pre-equalization coefficient set by using the PNMP algorithm, to obtain the relative distance between every two fault points in the fault point set, and uses the relative distance as the second relative distance set.

In this implementation, the PNMP algorithm may be used to perform analysis processing on the pre-equalization coefficient set, so as to calculate the relative distance between fault points in the fault group. A principle of the PNMP algorithm is not described herein, and reference may be made to the PNMP standard "CM-GL-PNMP-V02-110623" and other related data.

Partial HFC network faults shown in FIG. 3 are used as an example for description. For the fault group 1, a distance between fault points in the fault group 1 may be calculated according to the first pre-equalization coefficient set {CM3, CM4}. If only a distance L1 is obtained, it may be determined that the fault group 1 includes two fault points: a fault point R1 and a fault point R2 that are shown in the figure, and a relative distance between these two fault points is L1, that is, a first relative distance set for the fault group 1 is {L1}. Relative distances between every two fault points in a fault point set may be calculated according to the second pre-equalization coefficient set {CM3', CM4'}, and are relative distances L1, L2, and L1+L2 respectively, that is, a second relative distance set for the fault group 1 is {L1, L2, L1+L2}. For the fault group 2, a distance between fault points in the fault group 2 may be calculated according to the first pre-equalization coefficient set {CM2}. If a calculation result is 0, it may be determined that the fault group 2 includes only a single fault point: a fault point R3 shown in the figure, and a first relative distance set for the fault group 2 is {0}. A relative distance between every two fault points in a fault point set may be calculated according to the second pre-equalization coefficient set {CM2'}, that is, a relative distance L3 between the fault point R3 and the reference fault point may be calculated, and a second relative distance set for the fault group 2 is {0, L3}. It should be noted that, there are a plurality of devices between the fault point R2 and the fault point R3, and therefore, micro-reflection generated between the fault point R2 and the fault point R3 is slight, and may be omitted. Therefore, the fault point R3 and the fault point R2 are not in a same fault group.

206. The network management system determines a relative distance between each fault point in the fault group and the reference fault point according to the first relative distance set and the second relative distance set.

In this embodiment of the present disclosure, the network management system may analyze the relative distance calculated according to the pre-equalization coefficient collected before and after the reference fault point is added, to determine the relative distance between each fault point included in the fault group and the reference fault point. Because the second relative distance set includes the first relative distance set, the first relative distance set may be filtered out from the second relative distance set, and the relative distance between each fault point in the fault group and the reference fault point remains.

Partial HFC network faults shown in FIG. 3 are used as an example for description. For the fault group 1, the first relative distance set is {L1}, and the second relative distance set is {L1, L2, L1+L2}. The first relative distance set is filtered out from the second relative distance set, and remaining two distances are respectively a relative distance between the fault point R1 and the reference fault point $\Gamma_1$ and a relative distance between the fault point R2 and the reference fault point $\Gamma_1$.

In this embodiment of the present disclosure, because the location of the reference fault point is known, a location of each fault point in the fault group may be further determined according to the relative distance between each fault point in the fault group and the reference fault point and the location of the reference fault point.

In this embodiment of the present disclosure, when each fault point included in the fault group is located, the network management system may remove the added reference fault point, that is, disable the reference fault point, to reduce impact on a service.

In the method described in FIG. 2, the fault group in the HFC network may be obtained, the pre-equalization coefficient of the at least one CM is collected, to obtain the first pre-equalization coefficient set, and the reference fault point that is corresponding to the fault group and whose location is known is enabled. Then, the pre-equalization coefficient of the at least one CM may be collected again, to obtain the second pre-equalization coefficient set. The relative distance between every two fault points in the fault group is calculated according to the first pre-equalization coefficient set, to obtain the first relative distance set; the relative distance between every two fault points in the fault point set including all fault points and the reference fault point is calculated according to the second pre-equalization coefficient set, to obtain the second relative distance set. The relative distance between each fault point and the reference fault point is determined according to the first relative distance set and the second relative distance set. During implementation of the method described in FIG. 2, the reference fault point whose location is known can be added to the fault group, and before and after the reference fault point is added, the pre-equalization coefficient of the CM is collected twice to calculate the relative distance between each fault point in the fault group and the reference fault point, so as to obtain the location of each fault point in the fault group, so that not only each fault point in a fault group including a plurality of fault points can be located, but also a fault group including only a single fault point can be located.

Figure 4A:
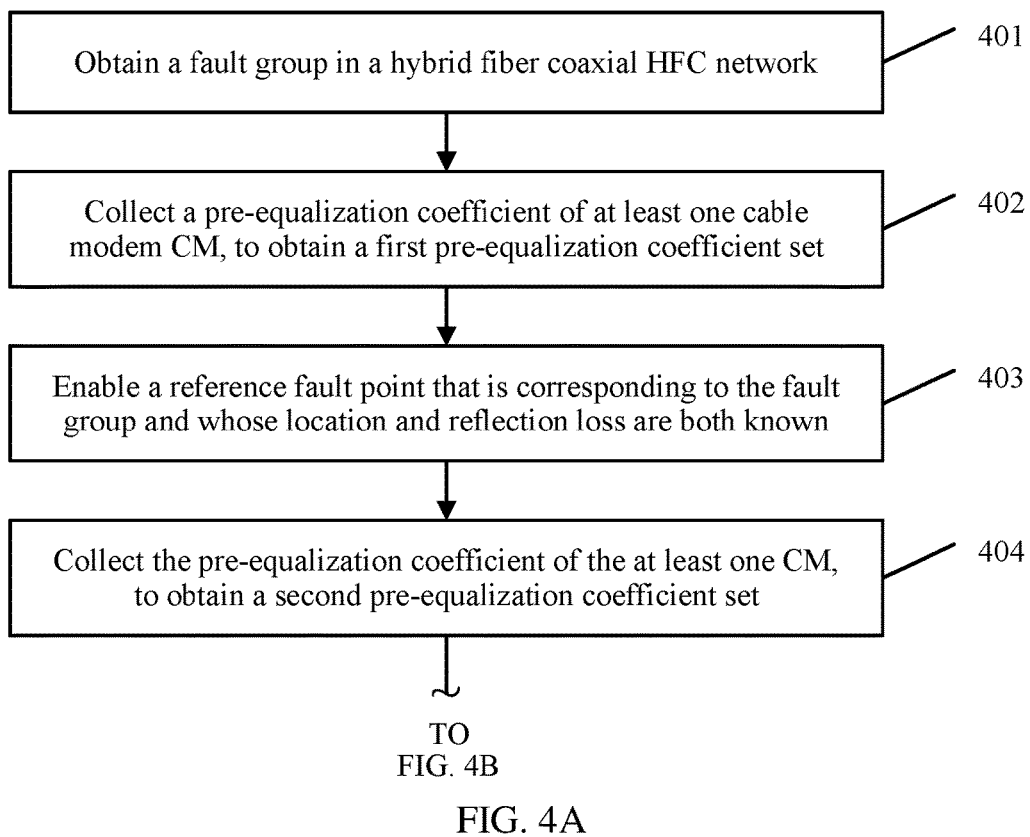
FIG. 4A and FIG. 4B are a schematic flowchart of another HFC network fault locating method disclosed in an embodiment of the present disclosure.
Figure 4B:
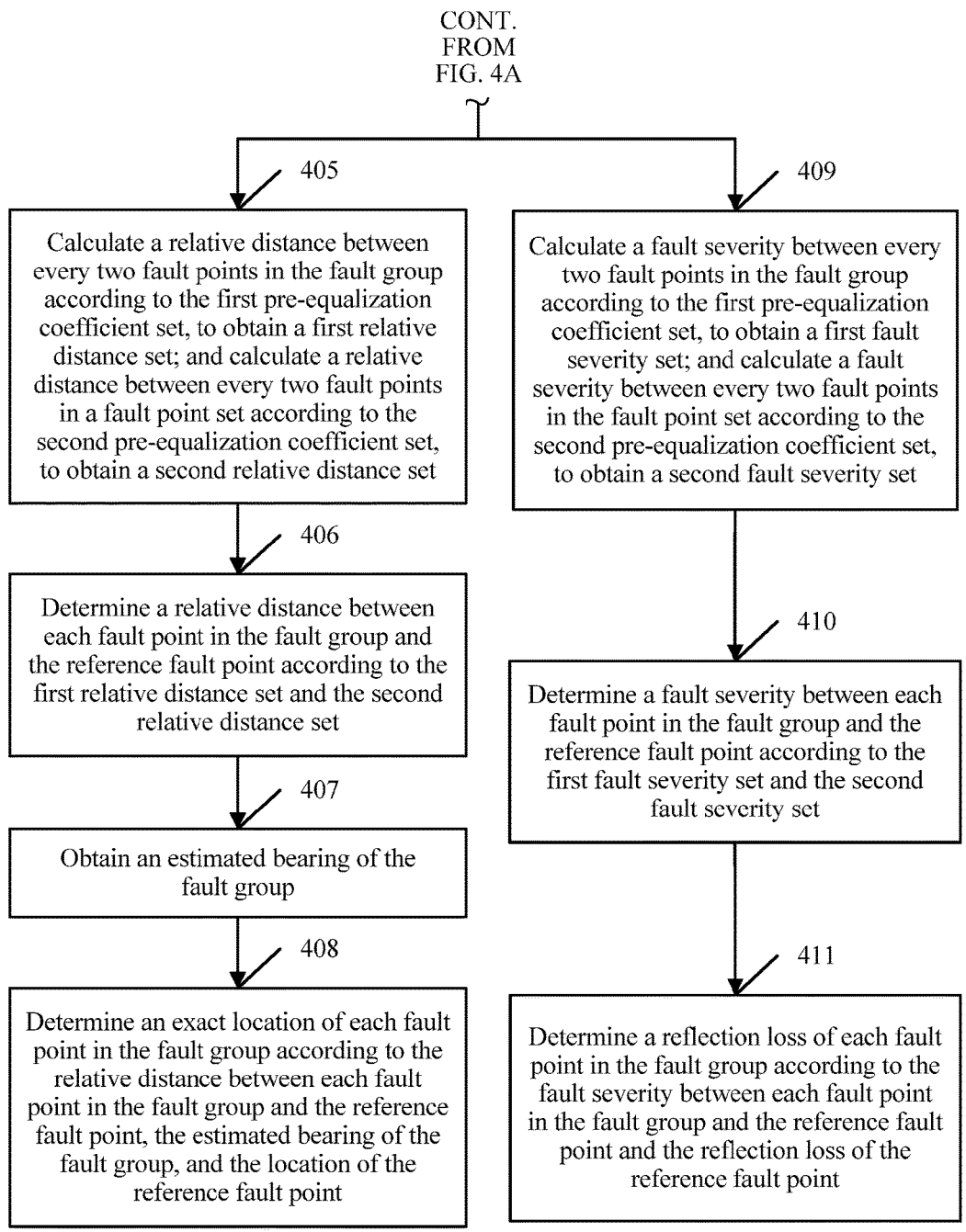

On the basis of the HFC network architecture shown in FIG. 1, an embodiment of the present disclosure discloses another HFC network fault locating method. Referring to FIG. 4A and FIG. 4B, FIG. 4A and FIG. 4B are a schematic flowchart of another HFC network fault locating method disclosed in an embodiment of the present disclosure. In this embodiment of the present disclosure, that an execution body is a network management system may be used as an example for description. When the execution body is another apparatus or device, implementation of this embodiment of the present disclosure is not affected. As shown in FIG. 4A and FIG. 4B, the HFC network fault locating method may include the following steps.

401. The network management system obtains a fault group in a hybrid fiber coaxial HFC network.

In this embodiment of the present disclosure, the HFC network may include one or more fault groups, and one fault group may include at least one fault point.

402. The network management system collects a pre-equalization coefficient of at least one cable modem CM, to obtain a first pre-equalization coefficient set.

In this embodiment of the present disclosure, the at least one CM may be a CM whose pre-equalization coefficient changes after the fault group emerges.

403. The network management system enables a reference fault point that is corresponding to the fault group and whose location and reflection loss are both known.

In this embodiment of the present disclosure, the reference fault point is an impedance mismatch point that changes the pre-equalization coefficient of the at least one CM that is collected for the fault group, and the impedance mismatch point may be a point at which input impedance does not match output impedance. The location of the reference fault point is known, and the reflection loss of the reference fault point is also known.

404. The network management system collects the pre-equalization coefficient of the at least one CM again, to obtain a second pre-equalization coefficient set.

405. The network management system calculates a relative distance between every two fault points in the fault group according to the first pre-equalization coefficient set, to obtain a first relative distance set; and calculates a relative distance between every two fault points in a fault point set according to the second pre-equalization coefficient set, to obtain a second relative distance set.

In this embodiment of the present disclosure, the fault point set may include all fault points in the fault group and the added reference fault point.

406. The network management system determines a relative distance between each fault point in the fault group and the reference fault point according to the first relative distance set and the second relative distance set.

407. The network management system obtains an estimated bearing of the fault group.

In this embodiment of the present disclosure, the estimated bearing of the fault group may be an approximate direction and location at which the fault group is located. The estimated bearing of the fault group may use the reference fault point as a reference object, to estimate that the fault group is approximately located at which bearing of the reference fault point, for example, the fault group is on the left, the right, or the like of the reference fault point.

It may be understood that, step 407 may be performed after step 406, or may be performed before step 406, or may be performed simultaneously with step 406. This is not limited in this embodiment of the present disclosure.

408. The network management system determines an exact location of each fault point in the fault group according to the relative distance between each fault point in the fault group and the reference fault point, the estimated bearing of the fault group, and the location of the reference fault point.

In this embodiment of the present disclosure, because the location of the reference fault point is known, the network management system may finally determine the location of each fault point in the fault group according to the obtained relative distance between each fault point in the fault group and the reference fault point, the estimated bearing of the fault group, and the location of the reference fault point. The location of each fault point is obtained, to facilitate maintenance personnel in maintaining each fault point, so that manpower and material resources for searching for the fault point are reduced.

409. The network management system calculates a fault severity between every two fault points in the fault group according to the first pre-equalization coefficient set, to obtain a first fault severity set; and calculates a fault severity between every two fault points in the fault point set according to the second pre-equalization coefficient set, to obtain a second fault severity set.

In this embodiment of the present disclosure, the fault severity may be referred to as a micro-reflection level (MRL), and may be used to reflect a micro-reflection degree between two fault points. The network management system may further calculate the fault severity (in a unit of dB) between every two fault points in the fault group according to the first pre-equalization coefficient set, in addition to calculating the relative distance between every two fault points in the fault group according to the first pre-equalization coefficient set, and may further calculate the fault severity between every two fault points in the fault point set according to the second pre-equalization coefficient set, in addition to calculating the relative distance between every two fault points in the fault point set according to the second pre-equalization coefficient set.

In this embodiment of the present disclosure, a fault severity between two fault points is related to a relative distance between these two fault points. A larger relative distance leads to a lower fault severity, and a smaller relative distance leads to a higher fault severity.

In an optional implementation, a specific implementation of step 409 in which a fault severity between every two fault points in the fault group is calculated according to the first pre-equalization coefficient set, to obtain a first fault severity set; and a fault severity between every two fault points in the fault point set is calculated according to the second pre-equalization coefficient set, to obtain a second fault severity set may include the following step:

(41) The network management system performs analysis processing on the first pre-equalization coefficient set by using a PNMP algorithm, to obtain the fault severity between every two fault points in the fault group, and uses the fault severity as the first fault severity set; and performs analysis processing on the second pre-equalization coefficient set by using the PNMP algorithm, to obtain the fault severity between every two fault points in the fault point set, and uses the fault severity as the second fault severity set.

Partial HFC network faults shown in FIG. 3 are used as an example for description. For a fault group 1, a relative distance L1 between fault points R1 and R2 may be calculated according to the first pre-equalization coefficient set, and a fault severity is an MRL1; and relative distances L1, L2, and L1+L2 between every two fault points in the fault points R1 and R2 and the reference fault point $\Gamma_1$ may be calculated according to the second pre-equalization coefficient set, and fault severalties are respectively an MRL1, an MRL2, and an MRL12. For a fault group 2, a relative distance L3 between a fault point R3 and a reference fault point $\Gamma_2$ may be calculated according to the second pre-equalization coefficient set, and a fault severity is an MRL3.

410. The network management system determines a fault severity between each fault point in the fault group and the reference fault point according to the first fault severity set and the second fault severity set.

In this embodiment of the present disclosure, the second fault severity set includes the first fault severity set. The network management system may filter out the first fault severity set from the second fault severity set, and the fault severity between each fault point in the fault group and the reference fault point remains.

Partial HFC network faults shown in FIG. 3 are used as an example for description. For the fault group 1, the first fault severity set is {MRL1}, and the second fault severity set is {MRL1, MRL2, MRL12}. The first fault severity set is filtered out from the second fault severity set, and remaining fault severalties are respectively a fault severity between the fault point R1 and the reference fault point $\Gamma_1$ and a fault severity between the fault point R2 and the reference fault point $\Gamma_1$.

411. The network management system determines a reflection loss of each fault point in the fault group according to the fault severity between each fault point in the fault group and the reference fault point and the reflection loss of the reference fault point.

In this embodiment of the present disclosure, because the reflection loss of the reference fault point is known, the reflection loss of each fault point in the fault group may be obtained according to the fault severity between each fault point in the fault group and the reference fault point and the reflection loss of the reference fault point.

In an optional implementation, a specific implementation of step 411 in which a reflection loss of each fault point in the fault group is determined according to the fault severity between each fault point in the fault group and the reference fault point and the reflection loss of the reference fault point may include the following step:

(42) The network management system calculates, for each of the fault points in the fault group, the reflection loss of the fault point according to the fault severity between the fault point and the reference fault point and the reflection loss of the reference fault point, where the reflection loss of the fault point is an absolute difference obtained by subtracting the reflection loss of the reference fault point from the fault severity between the fault point and the reference fault point.

Partial HFC network faults shown in FIG. 3 are used as an example for description. For the fault group 1, if the fault severity between the fault point R1 and the reference fault point $\Gamma_1$ is the MRL12, the fault severity between the fault point R2 and the reference fault point $\Gamma_1$ is the MRL2, and a reflection loss G1 of the reference fault point $\Gamma_1$ is known, when low-frequency cable attenuation is not considered, it may be obtained that a reflection loss of the fault point R1 is MRL12-G1 (dB), and a reflection loss of the fault point R2 is MRL2-G1 (dB). For the fault group 2, if the fault severity between the fault point R3 and the reference fault point $\Gamma_2$ is the MRL3, and a reflection loss G2 of the reference fault point $\Gamma_2$ is known, it may be obtained that a reflection loss of the fault point R3 is MRL3-G1 (dB).

It may be understood that, there is no necessary execution sequence between steps 405 to 408 and steps 409 to 411. Steps 405 to 408 may be performed before steps 409 to 411, or steps 405 to 408 may be performed after steps 409 to 411, or steps 405 to 408 and steps 409 to 411 may be performed simultaneously or interleaved. This is not limited in this embodiment of the present disclosure.

In this embodiment of the present disclosure, during implementation of the method described in FIG. 4A and FIG. 4B, the reference fault point whose location and reflection loss are both known is added to the fault group, and before and after the reference fault point is added, the pre-equalization coefficient of the CM is collected twice to calculate the relative distance between each fault point in the fault group and the reference fault point, so as to obtain the location of each fault point in the fault group, so that not only each fault point in a fault group including a plurality of fault points can be located, but also a fault group including only a single fault point can be located. In addition, the fault severity between each fault point in the fault group and the reference fault point may be calculated according to the pre-equalization coefficient of the CM that is collected twice before and after the reference fault point is added, so as to obtain the reflection loss of each fault point in the fault group, so that different levels of maintenance can be performed for reflection losses of different fault points.

Figure 5:
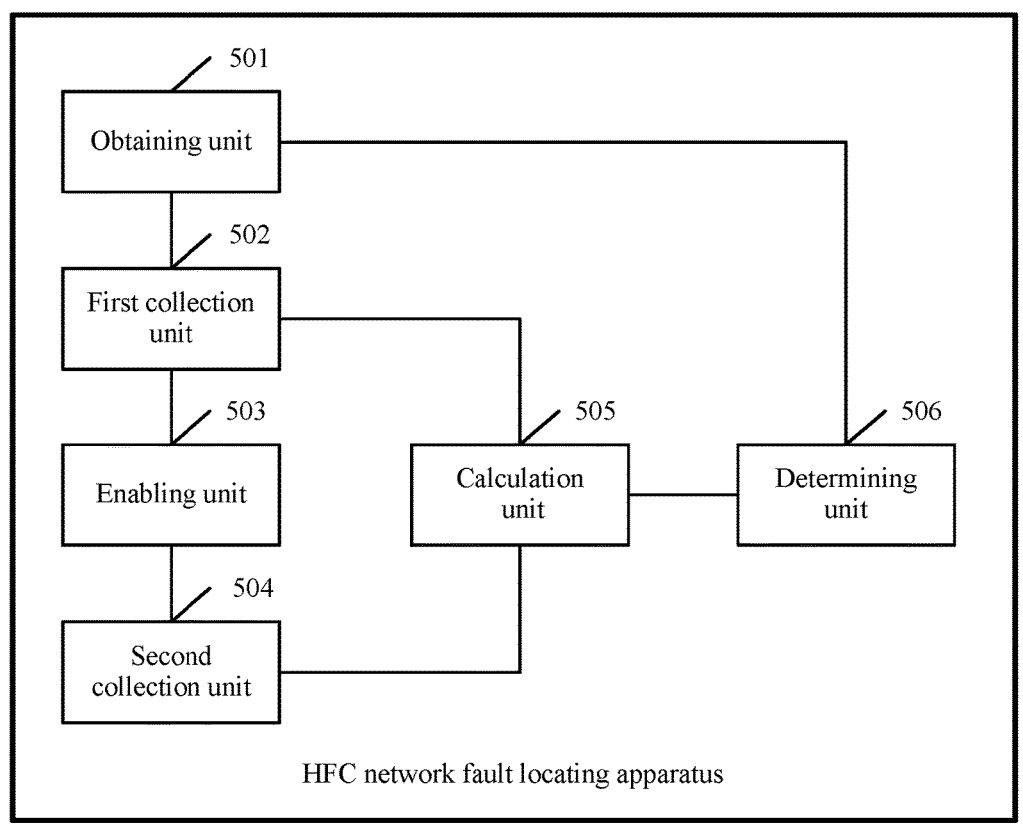
FIG. 5 is a schematic structural diagram of an HFC network fault locating apparatus disclosed in an embodiment of the present disclosure.

On the basis of the HFC network architecture shown in FIG. 1, an embodiment of the present disclosure discloses an HFC network fault locating apparatus. Referring to FIG. 5, FIG. 5 is a schematic structural diagram of an HFC network fault locating apparatus disclosed in an embodiment of the present disclosure. The apparatus may be configured to execute the HFC network fault locating methods disclosed in the embodiments of the present disclosure. In this embodiment of the present disclosure, a physical form of the HFC network fault locating apparatus shown in FIG. 5 may be a network management system. As shown in FIG. 5, the HFC network fault locating apparatus may include an obtaining unit 501, a first collection unit 502, an enabling unit 503, a second collection unit 504, a calculation unit 505, and a determining unit 506.

The obtaining unit 501 is configured to obtain a fault group in a hybrid fiber coaxial HFC network.

In this embodiment of the present disclosure, the HFC network may have one fault group, or may have a plurality of fault groups at the same time. One fault group may include at least one fault point.

The first collection unit 502 is configured to collect a pre-equalization coefficient of at least one CM, to obtain a first pre-equalization coefficient set.

In this embodiment of the present disclosure, the at least one CM may be a CM whose pre-equalization coefficient changes after the fault group emerges, that is, at least one CM affected by the fault group.

The enabling unit 503 is configured to enable a reference fault point that is corresponding to the fault group and whose location is known.

In this embodiment of the present disclosure, the reference fault point is an impedance mismatch point that changes, after the reference fault point is enabled, the pre-equalization coefficient of the at least one CM that is collected for the fault group, and the impedance mismatch point is a point at which input impedance does not match output impedance.

The second collection unit 504 is configured to: after the enabling unit 503 enables the reference fault point that is corresponding to the fault group and whose location is known, collect the pre-equalization coefficient of the at least one CM, to obtain a second pre-equalization coefficient set.

The calculation unit 505 is configured to: calculate a relative distance between every two fault points in the fault group according to the first pre-equalization coefficient set obtained by the first collection unit 502, to obtain a first relative distance set; and calculate a relative distance between every two fault points in a fault point set according to the second pre-equalization coefficient set obtained by the second collection unit 504, to obtain a second relative distance set.

In this embodiment of the present disclosure, the fault point set includes all fault points included in the fault group and the reference fault point added for the fault group. The second relative distance set includes the first relative distance set.

In an optional implementation, a specific implementation in which the calculation unit 505 calculates the relative distance between every two fault points in the fault group according to the first pre-equalization coefficient set obtained by the first collection unit 502, to obtain the first relative distance set; and calculates the relative distance between every two fault points in the fault point set according to the second pre-equalization coefficient set obtained by the second collection unit 504, to obtain the second relative distance set may be as follows:

The calculation unit 505 performs, by using a PNMP algorithm, analysis processing on the first pre-equalization coefficient set obtained by the first collection unit 502, to obtain the relative distance between every two fault points in the fault group, and uses the relative distance as the first relative distance set; and performs, by using the PNMP algorithm, analysis processing on the second pre-equalization coefficient set obtained by the second collection unit 504, to obtain the relative distance between every two fault points in the fault point set, and uses the relative distance as the second relative distance set.

The determining unit 506 is configured to determine a relative distance between each fault point in the fault group and the reference fault point according to the first relative distance set and the second relative distance set that are obtained by the calculation unit 505.

In this embodiment of the present disclosure, because the second relative distance set includes the first relative distance set, the first relative distance set may be filtered out from the second relative distance set, and the relative distance between each fault point in the fault group and the reference fault point remains.

In an optional implementation, the obtaining unit 501 is further configured to obtain an estimated bearing of the fault group. The estimated bearing may include an approximate direction and location at which the fault group is located.

Correspondingly, the determining unit 506 is further configured to determine a location of each fault point in the fault group according to the relative distance between each fault point in the fault group and the reference fault point, the estimated bearing that is of the fault group and that is obtained by the obtaining unit 501, and the location of the reference fault point.

In an optional implementation, a reflection loss of the reference fault point is known. In the HFC network fault locating apparatus shown in FIG. 5:

The calculation unit 505 is further configured to: calculate a fault severity between every two fault points in the fault group according to the first pre-equalization coefficient set obtained by the first collection unit 502, to obtain a first fault severity set; and calculate a fault severity between every two fault points in the fault point set according to the second pre-equalization coefficient set obtained by the second collection unit 504, to obtain a second fault severity set.

In an optional implementation, a specific implementation in which the calculation unit 505 calculates the fault severity between every two fault points in the fault group according to the first pre-equalization coefficient set obtained by the first collection unit 502, to obtain the first fault severity set; and calculates the fault severity between every two fault points in the fault point set according to the second pre-equalization coefficient set obtained by the second collection unit 504, to obtain the second fault severity set may be as follows:

The calculation unit 505 performs, by using the PNMP algorithm, analysis processing on the first pre-equalization coefficient set obtained by the first collection unit 502, to obtain the fault severity between every two fault points in the fault group, and uses the fault severity as the first fault severity set; and performs, by using the PNMP algorithm, analysis processing on the second pre-equalization coefficient set obtained by the second collection unit 504, to obtain the fault severity between every two fault points in the fault point set, and uses the fault severity as the second fault severity set.

Correspondingly, the determining unit 506 is further configured to determine a fault severity between each fault point in the fault group and the reference fault point according to the first fault severity set and the second fault severity set that are obtained by the calculation unit 505.

The determining unit 506 is further configured to determine a reflection loss of each fault point in the fault group according to the fault severity between each fault point in the fault group and the reference fault point and the reflection loss of the reference fault point.

In an optional implementation, a specific implementation in which the determining unit 506 determines the reflection loss of each fault point in the fault group according to the fault severity between each fault point in the fault group and the reference fault point and the reflection loss of the reference fault point may be as follows:

The determining unit 506 calculates, for each of the fault points in the fault group, the reflection loss of the fault point according to the fault severity between the fault point and the reference fault point and the reflection loss of the reference fault point, where the reflection loss of the fault point is an absolute difference obtained by subtracting the reflection loss of the reference fault point from the fault severity between the fault point and the reference fault point.

In this embodiment of the present disclosure, during implementation of the HFC network fault locating apparatus shown in FIG. 5, the reference fault point whose location and reflection loss are both known is added to the fault group, and before and after the reference fault point is added, the pre-equalization coefficient of the CM is collected twice to calculate the relative distance between each fault point in the fault group and the reference fault point, so as to obtain the location of each fault point in the fault group, so that not only each fault point in a fault group including a plurality of fault points can be located, but also a fault group including only a single fault point can be located. In addition, the fault severity between each fault point in the fault group and the reference fault point may be calculated according to the pre-equalization coefficient of the CM that is collected twice before and after the reference fault point is added, so as to obtain the reflection loss of each fault point in the fault group, so that different levels of maintenance can be performed for reflection losses of different fault points.

Figure 6:
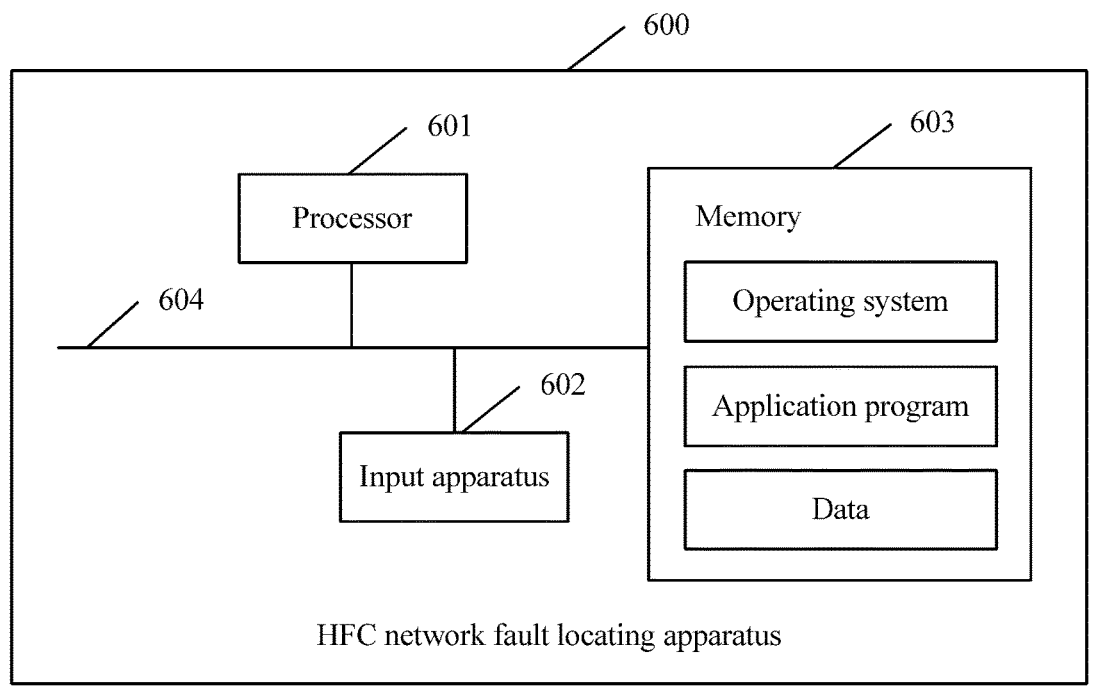
FIG. 6 is a schematic structural diagram of another HFC network fault locating apparatus disclosed in an embodiment of the present disclosure.

On the basis of the HFC network architecture shown in FIG. 1, an embodiment of the present disclosure discloses another HFC network fault locating apparatus. Referring to FIG. 6, FIG. 6 is a schematic structural diagram of another HFC network fault locating apparatus disclosed in an embodiment of the present disclosure. The apparatus may be configured to execute the HFC network fault locating methods disclosed in the embodiments of the present disclosure. In this embodiment of the present disclosure, a physical form of the HFC network fault locating apparatus shown in FIG. 6 may be a network management system. As shown in FIG. 6, the HFC network fault locating apparatus 600 may include components such as at least one processor 601, for example, a CPU (central processing unit), at least one input apparatus 602, and a memory 603. These components are communicatively connected by using one or more buses 604. A person skilled in the art may understand that a structure of the HFC network fault locating apparatus shown in FIG. 6 does not constitute a limitation on this embodiment of the present disclosure. The structure may not only be a bus structure, but may also be a star structure, and may further include components more or fewer than those shown in the figure, or combine some components, or have different component arrangements.

In this embodiment of the present disclosure, the input apparatus 602 may include a wired interface, a wireless interface, and the like, and may be configured to collect a pre-equalization coefficient of a CM in an HFC network.

In this embodiment of the present disclosure, the memory 603 may be a high-speed RAM memory or a non-volatile memory, for example, at least one magnetic disk storage. Optionally, the memory 603 may also be at least one storage apparatus that is located far away from the foregoing processor 601. As shown in FIG. 6, as a computer storage medium, the memory 603 may include an operating system, an application program, data, and the like, and this is not limited in this embodiment of the present disclosure.

In the HFC network fault locating apparatus shown in FIG. 6, the processor 601 may be configured to invoke the application program stored in the memory 603 to execute the following operations:

obtaining a fault group in a hybrid fiber coaxial HFC network, where the fault group includes at least one fault point;

controlling the input apparatus 602 to collect a pre-equalization coefficient of at least one cable modem CM, to obtain a first pre-equalization coefficient set, where the at least one CM is a CM whose pre-equalization coefficient changes after the fault group emerges;

enabling a reference fault point that is corresponding to the fault group and whose location is known, where the reference fault point is an impedance mismatch point that changes the pre-equalization coefficient of the at least one CM;

controlling the input apparatus 602 to collect the pre-equalization coefficient of the at least one CM again, to obtain a second pre-equalization coefficient set;

calculating a relative distance between every two fault points in the fault group according to the first pre-equalization coefficient set, to obtain a first relative distance set; and calculating a relative distance between every two fault points in a fault point set according to the second pre-equalization coefficient set, to obtain a second relative distance set, where the fault point set includes all fault points in the fault group and the reference fault point; and determining a relative distance between each fault point in the fault group and the reference fault point according to the first relative distance set and the second relative distance set.

In an optional implementation, the processor 601 is further configured to invoke the application program stored in the memory 603 to perform the following steps:

obtaining an estimated bearing of the fault group, where the estimated bearing includes an approximate direction and location at which the fault group is located; and determining a location of each fault point in the fault group according to the relative distance between each fault point in the fault group and the reference fault point, the estimated bearing of the fault group, and the location of the reference fault point.

In an optional implementation, a specific implementation in which the processor 601 calculates the relative distance between every two fault points in the fault group according to the first pre-equalization coefficient set, to obtain the first relative distance set; and calculates the relative distance between every two fault points in the fault point set according to the second pre-equalization coefficient set, to obtain the second relative distance set may be:

performing analysis processing on the first pre-equalization coefficient set by using a proactive network maintenance using pre-equalization PNMP algorithm, to obtain the relative distance between every two fault points in the fault group, and using the relative distance as the first relative distance set; and performing analysis processing on the second pre-equalization coefficient set by using the PNMP algorithm, to obtain the relative distance between every two fault points in the fault point set, and using the relative distance as the second relative distance set.

In an optional implementation, a reflection loss of the reference fault point is known, and the processor 601 is further configured to invoke the application program stored in the memory 603 to perform the following steps:

calculating a fault severity between every two fault points in the fault group according to the first pre-equalization coefficient set, to obtain a first fault severity set; and calculating a fault severity between every two fault points in the fault point set according to the second pre-equalization coefficient set, to obtain a second fault severity set;

determining a fault severity between each fault point in the fault group and the reference fault point according to the first fault severity set and the second fault severity set; and determining a reflection loss of each fault point in the fault group according to the fault severity between each fault point in the fault group and the reference fault point and the reflection loss of the reference fault point.

In an optional implementation, a specific implementation in which the processor 601 calculates the fault severity between every two fault points in the fault group according to the first pre-equalization coefficient set, to obtain the first fault severity set; and calculates the fault severity between every two fault points in the fault point set according to the second pre-equalization coefficient set, to obtain the second fault severity set may be:

performing analysis processing on the first pre-equalization coefficient set by using the PNMP algorithm, to obtain the fault severity between every two fault points in the fault group, and using the fault severity as the first fault severity set; and performing analysis processing on the second pre-equalization coefficient set by using the PNMP algorithm, to obtain the fault severity between every two fault points in the fault point set, and using the fault severity as the second fault severity set.

In an optional implementation, a specific implementation in which the processor 601 determines the reflection loss of each fault point in the fault group according to the fault severity between each fault point in the fault group and the reference fault point and the reflection loss of the reference fault point may be:

calculating, for each of the fault points in the fault group, the reflection loss of the fault point according to the fault severity between the fault point and the reference fault point and the reflection loss of the reference fault point, where the reflection loss of the fault point is an absolute difference obtained by subtracting the reflection loss of the reference fault point from the fault severity between the fault point and the reference fault point.

Specifically, the HFC network fault locating apparatus described in this embodiment of the present disclosure may implement some or all procedures in the embodiment of the HFC network fault locating method described with reference to FIG. 2 or FIG. 4A and FIG. 4B in the present disclosure.

In this embodiment of the present disclosure, during implementation of the HFC network fault locating apparatus shown in FIG. 6, the reference fault point whose location and reflection loss are both known is added to the fault group, and before and after the reference fault point is added, the pre-equalization coefficient of the CM is collected twice to calculate the relative distance between each fault point in the fault group and the reference fault point, so as to obtain the location of each fault point in the fault group, so that not only each fault point in a fault group including a plurality of fault points can be located, but also a fault group including only a single fault point can be located. In addition, the fault severity between each fault point in the fault group and the reference fault point may be calculated according to the pre-equalization coefficient of the CM that is collected twice before and after the reference fault point is added, so as to obtain the reflection loss of each fault point in the fault group, so that different levels of maintenance can be performed for reflection losses of different fault points.

Figure 7:
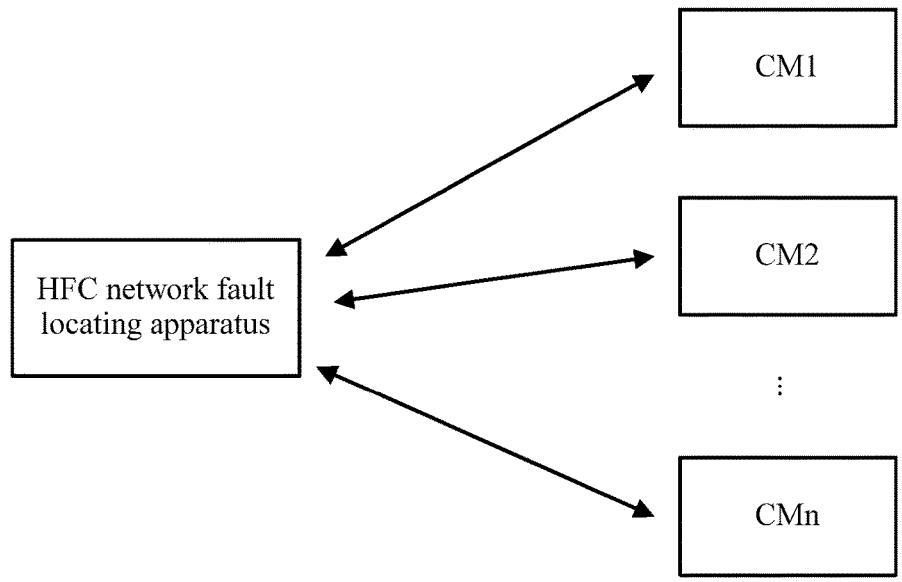
FIG. 7 is a schematic structural diagram of an HFC network fault locating system disclosed in an embodiment of the present disclosure.

On the basis of the HFC network architecture shown in FIG. 1, an embodiment of the present disclosure discloses an HFC network fault locating system. Referring to FIG. 7, FIG. 7 is a schematic structural diagram of an HFC network fault locating system disclosed in an embodiment of the present disclosure. As shown in FIG. 7, the HFC network fault locating system may include at least one CM and the HFC network fault locating apparatus shown in FIG. 5. The HFC network fault locating apparatus establishes communicative connections to a CM1, a CM 2, . . . , and a CMn (n is a positive integer). A specific function of the HFC network fault locating apparatus is described in detail in the foregoing embodiments. For the HFC network fault locating apparatus and the at least one CM that are related to this embodiment of the present disclosure, reference may be made to content in the foregoing embodiments. Details are not described herein.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also appreciate that the related actions and modules are not necessarily mandatory to the present disclosure.

In the foregoing embodiments, the description of each embodiment has respective focuses. For a part that is not described in detail in an embodiment, reference may be made to related descriptions in other embodiments.

A sequence of the steps of the method in the embodiments of the present disclosure may be adjusted, and some steps may be merged or removed according to an actual requirement.

The units in the apparatus in the embodiments of the present disclosure may be combined, divided, or deleted according to an actual requirement.

A person of ordinary skill in the art may understand that, all or apart of the steps in each method of the foregoing embodiments may be implemented by a program instructing related hardware. The program may be stored in a computer readable storage medium. The storage medium includes a read-only memory (ROM), a random access memory (RAM), a programmable read-only memory (PROM), an erasable programmable read-only memory (EPROM), a one-time programmable read-only memory (OTPROM), an electrically-erasable programmable read-only memory, (EEPROM), a compact disc read-only memory (CD-ROM), or another optical disk memory, magnetic disk memory, magnetic tape memory, or any other computer readable medium that can be configured to carry or store data.

The HFC network fault locating method, apparatus, and system disclosed in the embodiments of the present disclosure are described in detail above. Specific examples are used in this specification to describe the principle and implementations of the present disclosure. The descriptions of the foregoing embodiments are merely intended to make the method and core idea of the present disclosure more comprehensible. In addition, with respect to the implementations and the application scope, modifications may be made by a person of ordinary skill in the art according to the idea of the present disclosure. Therefore, content of this specification shall not be construed as a limitation on the present disclosure.

What is claimed is:

1. A method, comprising:
    obtaining a fault group in a hybrid fiber coaxial (HFC) network, wherein the fault group comprises at least one fault point;
    collecting a pre-equalization coefficient of at least one cable modem (CM), to obtain a first pre-equalization coefficient set, wherein the pre-equalization coefficient of the at least one CM changes after the fault group emerges;
    enabling a reference fault point that corresponds to the fault group and whose location is known, wherein the reference fault point comprises an impedance mismatch point that changes the pre-equalization coefficient of the at least one CM;
    collecting the pre-equalization coefficient of the at least one CM again, to obtain a second pre-equalization coefficient set;
    calculating a relative distance between every two fault points of the fault group according to the first pre-equalization coefficient set, to obtain a first relative distance set;
    calculating a relative distance between every two fault points of a fault point set according to the second pre-equalization coefficient set, to obtain a second relative distance set, wherein the fault point set comprises the fault group and the reference fault point; and
    determining a relative distance between each fault point of the fault group and the reference fault point according to the first relative distance set and the second relative distance set.

2. The method according to claim 1, further comprising:
    obtaining an estimated bearing of the fault group, wherein the estimated bearing comprises an approximate direction and location at which the fault group is located; and
    determining a location of each fault point of the fault point group according to the relative distance between each fault point of the fault point group and the reference fault point, the estimated bearing of the fault group, and the location of the reference fault point.

3. The method according to claim 1, wherein calculating the relative distance between every two fault points of the fault group according to the first pre-equalization coefficient set, to obtain the first relative distance set, and calculating the relative distance between every two fault points of the fault point set according to the second pre-equalization coefficient set, to obtain the second relative distance set comprises:
    performing analysis processing on the first pre-equalization coefficient set by using a proactive network maintenance using a pre-equalization (PNMP) algorithm, to obtain the relative distance between every two fault points of the fault group, and using the relative distance between every two fault points of the fault group as the first relative distance set; and
    performing analysis processing on the second pre-equalization coefficient set by using the PNMP algorithm, to obtain the relative distance between every two fault points of the fault point set, and using the relative distance between every two fault points of the fault point set as the second relative distance set.

4. The method according to claim 1, wherein:
a reflection loss of the reference fault point is known; and
the method further comprises:
    calculating a fault severity between every two fault points of the fault point group according to the first pre-equalization coefficient set, to obtain a first fault severity set, calculating a fault severity between every two fault points of the fault point set according to the second pre-equalization coefficient set, to obtain a second fault severity set, determining a fault severity between each fault point and the reference fault point according to the first fault severity set and the second fault severity set, and determining a reflection loss of each fault point of the fault point group according to the fault severity between each fault point and the reference fault point of the fault point group and the reflection loss of the reference fault point.

5. The method according to claim 4, wherein calculating the fault severity between every two fault points of the fault point group according to the first pre-equalization coefficient set, to obtain the first fault severity set, and calculating the fault severity between every two fault points of the fault point set according to the second pre-equalization coefficient set, to obtain the second fault severity set comprises:

performing analysis processing on the first pre-equalization coefficient set by using a pre-equalization (PNMP) algorithm, to obtain the fault severity between every two fault points of the fault point group, and using the fault severity between every two fault points of the fault point group as the first fault severity set; and performing analysis processing on the second pre-equalization coefficient set by using the PNMP algorithm, to obtain the fault severity between every two fault points of the fault point set, and using the fault severity between every two fault points of the fault point set as the second fault severity set.

6. The method according to claim 4, wherein determining the reflection loss of each fault point of the fault point group according to the fault severity between each fault point of the fault point group and the reference fault point and the reflection loss of the reference fault point comprises:

calculating, for each of the fault points of the fault point group, the reflection loss of the fault point according to the fault severity between the fault point and the reference fault point and the reflection loss of the reference fault point, wherein the reflection loss of the fault point is an absolute difference obtained by subtracting the reflection loss of the reference fault point from the fault severity between the fault point and the reference fault point.

7. A hybrid fiber coaxial (HFC) network fault locating apparatus, comprising:

an input apparatus;
a processor;
a memory configured to store a program and data; and
a communications bus configured to establish connection and communication between the processor, the memory, and the input apparatus;

wherein the processor is configured to invoke the program stored in the memory to:

obtain a fault group in an HFC network, wherein the fault group comprises at least one fault point, control the input apparatus to collect a pre-equalization coefficient of at least one cable modem (CM), to obtain a first pre-equalization coefficient set, wherein the pre-equalization coefficient of the at least one CM changes after the fault group emerges, enable a reference fault point that corresponds to the fault group and whose location is known, wherein the reference fault point comprises an impedance mismatch point that changes the pre-equalization coefficient of the at least one CM, control the input apparatus to collect the pre-equalization coefficient of the at least one CM again, to obtain a second pre-equalization coefficient set, calculate a relative distance between every two fault points of the fault group according to the first pre-equalization coefficient set, to obtain a first relative distance set, calculate a relative distance between every two fault points of a fault point set according to the second pre-equalization coefficient set, to obtain a second relative distance set, wherein the fault point set comprises the fault group and the reference fault point, and determine a relative distance between each fault point of the fault group and the reference fault point according to the first relative distance set and the second relative distance set.

8. The apparatus according to claim 7, wherein the processor is further configured to invoke the program stored in the memory to:

obtain an estimated bearing of the fault group, wherein the estimated bearing comprises an approximate direction and location at which the fault group is located; and determine a location of each fault point of the fault group according to the relative distance between each fault point of the fault group and the reference fault point, the estimated bearing of the fault group, and the location of the reference fault point.

9. The apparatus according to claim 7, wherein to calculate the relative distance between every two fault points of the fault group according to the first pre-equalization coefficient set, to obtain the first relative distance set, and to calculate the relative distance between every two fault points of the fault point set according to the second pre-equalization coefficient set, to obtain the second relative distance set, the processor is configured to invoke the program stored in the memory to:

perform analysis processing on the first pre-equalization coefficient set by using a proactive network maintenance using a pre-equalization (PNMP) algorithm, to obtain the relative distance between every two fault points of the fault group, and use the relative distance between every two fault points of the fault group as the first relative distance set; and perform analysis processing on the second pre-equalization coefficient set by using the PNMP algorithm, to obtain the relative distance between every two fault points of the fault point set, and use the relative distance between every two fault points of the fault point set as the second relative distance set.

10. The apparatus according to claim 7, wherein:
a reflection loss of the reference fault point is known; and
the processor is further configured to invoke the program stored in the memory to:

calculate a fault severity between every two fault points of the fault group according to the first pre-equalization coefficient set, to obtain a first fault severity set, calculate a fault severity between every two fault points of the fault point set according to the second pre-equalization coefficient set, to obtain a second fault severity set, determine a fault severity between each fault point of the fault group and the reference fault point according to the first fault severity set and the second fault severity set, and determine a reflection loss of each fault point of the fault group according to the fault severity between each fault point of the fault group and the reference fault point and the reflection loss of the reference fault point.

11. The apparatus according to claim 10, wherein to calculate the fault severity between every two fault points of the fault group according to the first pre-equalization coefficient set, to obtain the first fault severity set, and to calculate the fault severity between every two fault points of the fault point set according to the second pre-equalization coefficient set, to obtain the second fault severity set, the processor is configured to invoke the program stored in the memory to:

perform analysis processing on the first pre-equalization coefficient set by using a pre-equalization (PNMP) algorithm, to obtain the fault severity between every two fault points of the fault group, and use the fault severity between every two fault points of the fault group as the first fault severity set; and perform analysis processing on the second pre-equalization coefficient set by using the PNMP algorithm, to obtain the fault severity between every two fault points of the fault point set, and use the fault severity between every two fault points of the fault point set as the second fault severity set.

12. The apparatus according to claim 10, wherein to determine the reflection loss of each fault point of the fault group according to the fault severity between each fault point of the fault group and the reference fault point and the reflection loss of the reference fault point, the processor is configured to invoke the program stored in the memory to:

calculate, for each of the fault points of the fault group, the reflection loss of the fault point according to the fault severity between the fault point and the reference fault point and the reflection loss of the reference fault point, wherein the reflection loss of the fault point is an absolute difference obtained by subtracting the reflection loss of the reference fault point from the fault severity between the fault point and the reference fault point.

* * * * *